United States Patent
Webber

(10) Patent No.: US 7,594,097 B2
(45) Date of Patent: Sep. 22, 2009

(54) MICROPROCESSOR OUTPUT PORTS AND CONTROL OF INSTRUCTIONS PROVIDED THEREFROM

(75) Inventor: Andrew Webber, Hertfordshire (GB)

(73) Assignee: Imagination Technologies Limited, Hertfordshire (GB)

( * ) Notice: Subject to any disclaimer, the term of this patent is extended or adjusted under 35 U.S.C. 154(b) by 0 days.

(21) Appl. No.: 11/632,567

(22) PCT Filed: Jul. 15, 2005

(86) PCT No.: PCT/GB2005/002804

§ 371 (c)(1),
(2), (4) Date: Jan. 11, 2008

(87) PCT Pub. No.: WO2006/005964

PCT Pub. Date: Jan. 19, 2006

(65) Prior Publication Data

US 2008/0250234 A1 Oct. 9, 2008

(30) Foreign Application Priority Data

Jul. 15, 2004 (GB) ................... 0415851.5

(51) Int. Cl.
*G06F 9/38* (2006.01)
(52) U.S. Cl. .................. 712/214; 712/34; 712/216; 712/219
(58) Field of Classification Search .............. 712/34, 712/214, 216, 219; 718/102
See application file for complete search history.

(56) References Cited

U.S. PATENT DOCUMENTS

| 5,812,839 | A | 9/1998 | Hoyt et al. |
| 5,978,838 | A | 11/1999 | Mohamed et al. |
| 6,349,297 | B1 | 2/2002 | Shaw et al. |
| 6,694,425 | B1 | 2/2004 | Eickemeyer |
| 2003/0163589 | A1 | 8/2003 | Bunce et al. |
| 2005/0091611 | A1* | 4/2005 | Colleran et al. ............. 715/804 |

FOREIGN PATENT DOCUMENTS

| GB | 2 387 932 A | 10/2003 |
| JP | 07-219774 A | 8/1995 |
| WO | WO 97/38372 | 10/1997 |
| WO | WO 01/33352 A1 | 5/2001 |
| WO | WO 02/067116 A2 | 8/2002 |

OTHER PUBLICATIONS

United Kingdom Search Report dated Sep. 22, 2005.
International Search report dated Oct. 27, 2005.

* cited by examiner

*Primary Examiner*—William M Treat
(74) *Attorney, Agent, or Firm*—Flynn, Thiel, Boutell & Tanis, P.C.

(57) ABSTRACT

A method and apparatus are provided for controlling instructions provided by a microprocessor output port to other execution units. A microprocessor pipeline of instructions is provided for each execution unit. These are scheduled via the microprocessor unit for each execution unit, a determination is made as to whether or not the execution unit can receive further instructions. If it cannot, it's associated pipeline is said to be stalled and instructions are deleted from the microprocessor pipeline. Its thread can then be restarted at a later time with the instruction corresponding to the instruction which was unable to execute.

12 Claims, 2 Drawing Sheets

A TYPICAL MICROPROCESSOR

A BUFFERED CO-PROCESSOR INTERFACE

A TYPICAL PROCESSOR PIPELINE

TIMESTAMP COMPARISON

MICROPROCESSOR OUTPUT PORTS AND CONTROL OF INSTRUCTIONS PROVIDED THEREFROM

FIELD OF THE INVENTION

This invention relates to microprocessor output ports and in particular to the control of instructions provided via these output ports for other execution units.

BACKGROUND OF THE INVENTION

In our British patent application no. 9607153.5 there is described a data processing management system for executing independent instruction threads an multi-threaded processor. This describes a microprocessor system having a priority of data inputs and outputs and a priority of data processing means. Each data processing means performs operations to execute instructions from at least one of a plurality of instruction threads. The control means selectively routes data between the data inputs and outputs via a selected one of the data processing means. The external interfaces (inputs and outputs) may be interfaces to co-processors which are used to perform other operations. These co-processors and the external interfaces in the microprocessor have to be integrated into the system so that they can be efficiently accessed by instructions running on the microprocessor.

Normally a microprocessor schedules instructions using knowledge about the capabilities of external units or co-processors. However, if a microprocessor is attached to another module with unpredictable behaviour this will not necessarily be possible. It is quite common for co-processors attached to microprocessors not to provide data to the controlling microprocessor about their operation and behaviour. Therefore, a microprocessor sending instructions to a co-processor has no knowledge as to whether or not the co-processor is capable of receiving those instructions. In the case of a multi-threaded system where more than one set of instructions may be provided to more than one co-processor this is particularly important since situations may arise where a number of co-processors are executing their instructions without a problem but another one is for some internal reason blocked and therefore unable to receive further instructions.

SUMMARY OF THE INVENTION

Preferred embodiments provide a system in which complex co-processors can be attached to a microprocessor with a minimum quantity of buffering between the microprocessor and any co-processor.

Preferably, the main execution unit pipelines of the microprocessor are stretched to be at least a minimum length which is at least as long as the length of the pipeline to any uncontrolled interfaces (co-processors). Thereafter, all pipelined operations are tagged with a time stamp which is used to control whether or not instructions which are being executed are able to complete. If they are not completed then they are effectively rewound and restarted. Certain instructions such as writing to a co-processor increment the time stamp and if such an instruction is found to cause an output port to indicate that it is blocked, the following instructions with different time stamps will be caused to disappear so that the instruction stream is then pointing to the correct next instruction and the state of the machine correctly reflects the state of the co-processor write.

In essence, therefore, preferred embodiments provide a microprocessor pipeline with a time stamp on instructions. Output ports have a register and if that register becomes full, any following dependent instructions are removed (rewound) and restarted when the blockage has cleared.

In accordance with one embodiment there is provided a method for controlling instructions provided by a microprocessor output port to at least one of their execution units comprising the steps of providing a thread of instructions via a microprocessor pipeline for the execution unit, time stamping the instructions, providing the instructions in turn by via an output port to the execution unit, detecting whether or not the execution unit is able to receive further instructions, and if the result of the detection is that the execution unit cannot receive further instructions, deleting instructions still present in the microprocessor pipeline for the thread, and restarting the thread with the instruction corresponding to the time stamped instructions which encountered the stalled execution unit.

In accordance with another embodiment of the invention there is provided a method for controlling instructions provided via a microprocessor output port to a plurality of execution units comprising the steps of scheduling a plurality of instruction threads for different ones of the execution units through microprocessor pipeline, for each executing thread, detecting whether or not it's execution unit is able to receive further instructions, deleting instructions still present in the microprocessor pipeline for that thread if it's execution unit is unable to receive further instructions, and restarting execution of that thread at a later time.

BRIEF DESCRIPTION OF THE DRAWINGS

A preferred embodiment of the invention will now be described in detail by way of example with reference to the accompanying drawings in which:

In FIG. 1 there as shown a typical microprocessor 1. This connects to the rest of system in which it resides via either one or more caches 2 or via one or more co-processors 3. In most situations the ability to send data to a cache or to one of the co-processors is wholly determined by the microprocessor itself using information regarding the flow of instructions recently sent to the cache or to a co-processor.

Further, the co-processors may themselves be similar to or in fact be microprocessors and will run instructions and display unpredictable behaviour. The ability of the microprocessor 1 to schedule data to be sent to a co-processor which has unpredictable behaviour is greatly reduced in such a situation as it no longer knows enough about the state of the system to determine whether or not that co-processor is able to take the data.

One solution to this problem is to insert a buffer between the microprocessor and any attached co-processor. In such a situation it is possible for the microprocessor to retain data concerning the capacity of the buffer to take future data and hence be able to schedule data transfers to it which do not overload the buffer. This approach, however, may be inefficient since when the interface is free flowing the gates associated with the buffer are not utilised. Furthermore, when the buffer fills up or drains out gaps may appear in the co-processor data stream due to extra latency resulting from the additional scheduling into the buffer, even though the microprocessor may be capable of streaming data into the co-processor on every cycle.

Figure 1:
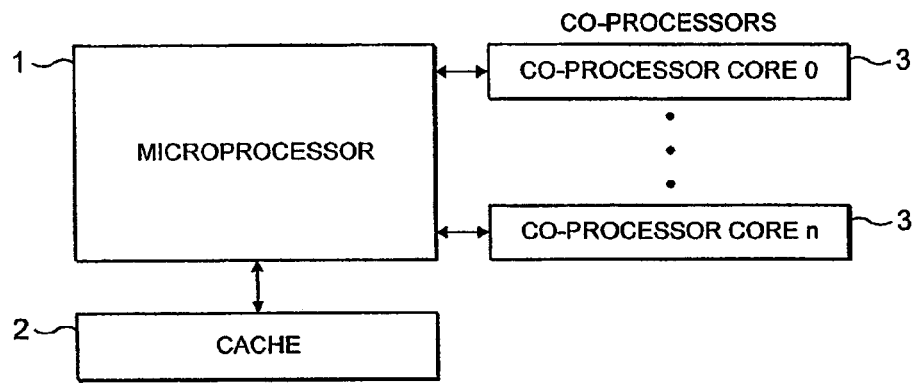
FIG. 1 shows a diagram of a typical microprocessor coupled to a number of co-processors.
Figure 2:
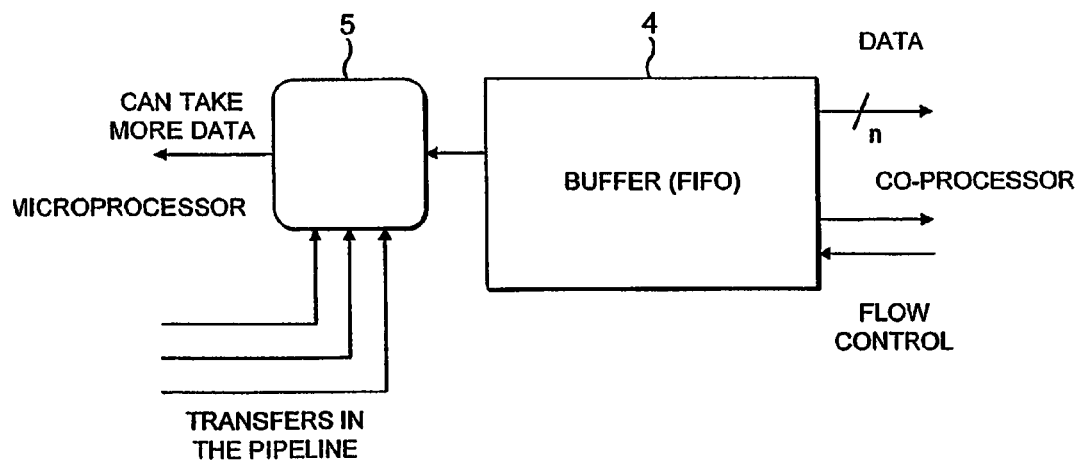
FIG. 2 shows a buffered co-processor interface.

An example of this buffering approach is shown in FIG. 2. In order for the buffer arrangement to work efficiently the microprocessor needs to know how much capacity will be left in the buffer once any transactions already in the pipeline arrive to be stored in the buffer. This capacity estimation is handled by logic 5 within the microprocessor that is supplied with data advising it how many transactions are in the pipeline and also how many are currently in the buffer. From this, the microprocessor can compute how many more data words can be issued without overloading the buffer 4. As can be seen, the logic 5 receives data from the microprocessor concerning transfers in the pipeline and also information from the buffer about its free capacity.

Removal of data from the buffer 4 is controlled by the co-processor which is linked to the opposite side of the buffer. This sends flow control data to the buffer which determines the rate at which data is read out from the buffer.

The amount of time from issuing an instruction on the microprocessor that sends data to a co-processor to that data being taken by the co-processor consists of the length of the microprocessor pipeline plus the amount of time taken to pass through the buffer. This time can be significant as it dictates the minimum size the buffer must be if it is to support the issuing of data words to the co-processor on every cycle. Therefore, for such an arrangement a buffer must typically hold as many transactions as may be outstanding in the whole round trip time. This is because the microprocessor does not receive any data about the impact of it's actions until after the round-trip time has elapsed. If the co-processor were to stop taking in data there could be a whole buffer full of data still in the pipeline. The alternative to this would be to reduce the buffer size but this would impact on the rate at which transfers to the co-processor could occur.

Figure 3:
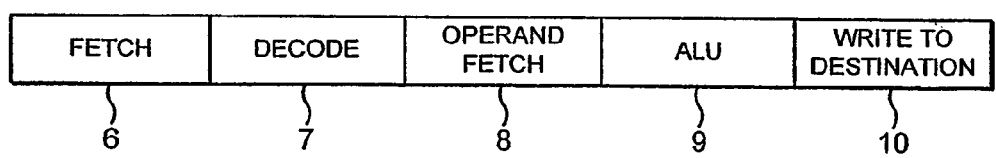
FIG. 3 shows a typical processor instruction pipeline.

A preferred embodiment of the current invention overcomes this problem by removing the buffer and making the microprocessor only dependent upon its internal state for the purposes of scheduling new instructions. This change requires a different approach to the problem of supporting externally controlled flow control to co-processors. A typical processor pipeline flow of instructions is shown in FIG. 3. This comprises a fetch instruction unit 6, decode instruction unit 7, a fetch operand unit 8, an Arithmetic Logic Unit 9 and a write to destination unit 10.

The embodiment of this invention uses the microprocessor's pipeline itself as the primary means of communicating with the co-processors. This therefore reduces the number of additional links which are required. In the embodiment, each co-processor is attached to the microprocessor using a single buffer register. Transactions from the microprocessor to the co-processor flow down the microprocessor's pipeline and into the buffer register which holds a single word of data. If the flow control from the register to the co-processor is found to be stalled then the microprocessor may choose to abandon instructions that followed and were destined for the co-processor by selectively deleting parts of the following instructions that control the "write to destination" unit of the pipeline (10). A decision as to whether or not instructions need to be abandoned is made based upon a time stamping of every instruction. They may also be based upon the effect of the instruction.

The majority of instructions that are issued have no dependency on the state of the co-processor interface. However, in the case of certain instructions such as co-processor transfer instructions or memory loads and stores there may be a need to depend upon the flow control of the co-processor interface.

Embodiment of this invention changes the time stamp of a current instruction if it depends upon something that may cause a rewind of instructions that have entered the pipeline. The time stamps themselves will have a range (e.g. 0-n), which should be at least twice the length of the microprocessor pipeline (or the longest pipeline available if the microprocessor has pipelines of varying lengths). If an external interface such as a co-processor output port is caused to stall then a flag is broadcast including the time stamp of the instruction going through that output port to all the pipelines indicating that any instructions with a more recent time stamp than that given in the broadcast should be prevented from reaching their destinations. This is done by preventing the write to destination unit 10 from operating, i.e. the write flag for those instructions is cleared.

Every destination update in the pipeline is tagged with the time stamp of its source instruction and for the given range of 0-n, each time stamp will have log 2n bits. When a broadcast is made a test is made on each of these tags to decide whether the time stamp it includes is more recent or not. This test is performed by establishing whether the two time stamps are in the bottom or top half of the range of time stamp values. The test is performed by testing to see if the broadcast time stamp excluding the top bit is greater than the end time stamp in the pipeline. Then if the top two bits of the two time stamps match, a rewind is deemed to be necessary if the pipeline is not greater than the broadcast time stamp, otherwise when the top differs a rewind is necessary if the pipeline time stamp is not greater than the broadcast time stamp. This is usually a less than or equal to test.

If both time stamps are in the same half of the range then the tagged time stamp is newer if it is greater than the broadcast time stamp. Otherwise the tagged time stamp is newer if it is less than or equal to the broadcast time stamp.

Figure 4:
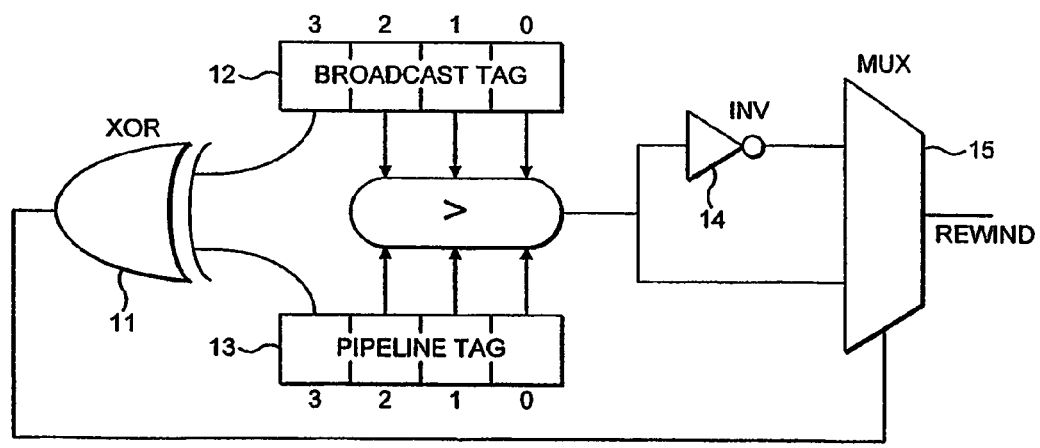
FIG. 4 shows a time stamp comparison circuit for use in an embodiment of the invention.

A diagram of the logic for time stamp comparison for a pipeline with up to eight states (and therefore a time stamp range of 0-15) is shown in FIG. 4. FIG. 4 shows the bits of a broadcast time stamp 12 being compared against each pipeline tag 13 via a greater than comparison unit 16. This comparison unit 16 uses all of the bits of the broadcast tag and each pipeline tag 13 apart from the most significant bit. The most significant bits are compared to each other in an exclusive OR gate 11 and are used to control a multiplexer 15. If the top bits are the same the output of the exclusive OR gate 11 is zero and the output of the multiplexer 15 is tied to the output of the comparison unit 16 and a rewind is invoked. If the top bits are not the same then the multiplexer switches to the inverted output of the comparison means 16 via inverter 14. The inverter effectively provides an output which means the pipeline tag is not greater than the broadcast tag. Thus, if both the most significant bits are the same the pipeline tag will have a greater value than the broadcast tag. The output of the comparison will therefore be directly to the multiplexer 15 and a rewind will be implemented.

If the MSB of the pipeline tag is greater than broadcast tag then the first three bits of the pipeline tag will be of a lower value than the first three bits of the broadcast tag, thereby giving the output "not greater than" which will be inverted by inverter 14 to cause the multiplexer 15 to pass this as a rewind signal. If it is determined that an instruction has to be abandoned then there are a number of problems to be resolved to ensure that the software running on the microprocessor remains correct.

The first of these is the issue of determining what is the next instruction to run on the microprocessor. Essentially, once a co-processor causes a pipeline stall, that in turn causes a microprocessor pipeline rewind. Therefore it is necessary to determine whether or not the current instruction to be issued is the correct next instruction. The main decision here relates to a determination as to whether intermediate instructions between the one that sent data to the co-processor and caused the rewind and the current instruction were themselves rewound. This decision can be made by comparing the time stamp of the current instruction against the broadcast rewind causing time stamp. If intermediate instructions were rewound then the current instruction's time stamp will have been moved on from the broadcast rewinding time stamp. Using the same test logic as that shown in FIG. 4, these time stamps can be compared.

If the time stamp is found to have changed then restarting the instruction stream at the correct point consists of aborting the current instruction and restarting the instruction fetch from the correct program counter address. Because any abandoned transactions have been removed from the pipeline it is possible to be sure that the current program counter address after the rewind will correctly reflect the point at which the program needs to restart. The current program counter value comes from the program counter execution unit pipeline. When a pipeline still occurs, actions still to do that are in the pipeline are discarded and the restart program counter address is retrieved from the program counter register. This is then used to restart the pipeline at the appropriate point.

The remaining task for restarting the program is determined by whether or not the co-processor port will be ready to accept more transactions. This can be determined by monitoring when the single-buffering register is allowed to empty itself. Once this register is empty it can be assumed that the co-processor will be ready to accept data and that the flow of instructions may be restarted. So far we have established that co-processor transfers are sent down the processor pipelines to a single buffer register which is attached to the co-processor. A detection is made when a co-processor has stopped accepting transfers, i.e. when data has to be held in a single buffer register until the co-processor is prepared to take it. What happens next depends on whether or not the next instruction is planning to send any co-processor transfer down the pipeline.

In one embodiment, when the processor is caused to rewind for a co-processor transfer, the affected thread is caused to rewind and also caused to hold off for a fixed period of time (usually a short but arbitrary number of cycles, e.g. eight cycles). If the instructions stream at the point at which restart occurs does not depend upon the readiness of the co-processor, it may restart and carry on as before independently of whether or not the co-processor is still busy. The instructions will continue to be issued until such time as something is to be sent to the co-processor. If the thread has to issue a co-processor transfer as its first action after restart then this point will be reached immediately. Thus, it can be seen that cessation of only the affected thread in a multithreaded system is preferable. Other unaffected threads can preferably continue to execute as normal.

Therefore, execution has stopped for a while, restarted and the system now wishes to send something to the co-processor that is busy. In such a situation the processor effectively uses the mechanisms described in our British patent application no. 9607153.5, the contents of which are incorporated herein by reference. What this means is that the instruction scheduler knows the resources required and the availability of those resources. Therefore, the system has an instruction to transfer to a co-processor. The scheduler looks at the status of the buffer register between it and the co-processor. If data is already held in the register then the co-processor is busy and instruction does not issue because the required resource is not yet available. When the system is freely sending data to a co-processor it is available to receive it, this blockage never arises (i.e. the resource test is effectively a test of whether the register is blocked whilst waiting for the co-processor claims).

As an example, we should consider a stream of instructions that are always trying to send data to a co-processor that takes only one item of data every one thousand cycles. The program commences sending data without problem. The first word sent is taken by the co-processor. The second word gets held in the buffer register, at which point the rewind logic gets triggered and deletes the third word which is still in the pipeline. The thread will then stall for a short period of time to return to a known good state, i.e. the right instruction is ready to run, and will then be held by the scheduler as a result of the resource requirements/availability test. The situation will remain in this state until the second word is removed from the buffer. This will be after one thousand cycles when it is read to the co-processor, at which point the buffer register becomes free. The program then starts issuing instructions again and the third word is held in the buffer register and causes a further rewind. This process carries on until the end of the stream of instructions.

Therefore, embodiments of the invention return the processor back to a ready-to-run state and then wait until the buffer register is cleared at which point running can recommence. The example given above of one word taken over one thousand cycles is extreme. A more realistic situation with an intelligent co-processor would be that the co-processor takes a series of commands until it has enough to go and commence a process at which point it may become busy and cause following commands to hold off until it has finished its initial process.

The system may operate for microprocessors with one or more output ports and with one or more coprocessors connected.

In the case of multi-threaded systems where one of more microprocessors is each handling a pipeline of instructions for a plurality of execution units, the threads of instructions are scheduled to pass through the microprocessor pipeline in dependence on their priority, or other criteria which may apply. For each thread which is executed, a determination is made as to whether or not its execution unit is capable of receiving further instructions. If it is not, that thread is stalled. If instructions are simply left sitting in the microprocessor, no further threads can be scheduled. Therefore, the embodiment, as described above, discards the instructions from the microprocessor pipeline thereby enabling other non-stalled threads to continue to execute. The stalled thread will then be restarted after a predetermined amount of time. It can continue to be restarted until such time as it's associated execution unit is ready to receive instructions again. When the instructions in the microprocessor are discarded, this is done using the time stamp method described above.

The invention claimed is:

1. A method for controlling instructions provided via a microprocessor output port to at least one other execution unit comprising the steps of providing a thread of instructions for an execution unit via a microprocessor pipeline, time stamping the instructions, providing instructions in turn via an output port to the execution unit, detecting whether or not the execution unit is able to receive further instructions, and if the result of the detection is that the execution unit cannot receive further instructions, deleting instructions for that thread still present in the microprocessor pipeline, and restarting the thread with an instruction corresponding to the time stamped instruction which was unable to execute.

2. A method according to claim 1 in which each execution unit is connected to the microprocessor output port via a register.

3. A method according to claim 1 including the step of comparing the time stamp of a current instruction unable to be received by the execution unit with the time stamps of instructions in the pipeline and discarding instructions in the pipeline in dependence on the result of the comparison.

4. A method according to claim 3 in which the instructions in the pipeline are discarded if their time stamps are greater in value than those on the current instruction.

5. A method according to claim 1 including the step of restarting a stalled thread by reading instructions from memory from an address corresponding to the address in which the current instruction unable to be executed is stored.

6. A method according to claim 1 including the step of scheduling multiple threads of instructions for execution units through the microprocessor and continuing to execute non-stalled threads in the event that one of threads is unable to execute.

7. A system for controlling instructions via a microprocessor output port to at least one other execution unit comprising a microprocessor pipeline supplying a thread of instructions for an execution unit, means for time stamping the instructions, means for providing instructions in turn via the output port to the execution unit, means for detecting whether or not the execution unit is able to receive further instructions, means for deleting instructions still present in the microprocessor pipeline if the result of the detection is that the execution unit cannot receive further instructions, and means for restarting the thread with an instruction corresponding to the time stamped instruction which was unable to execute.

8. A system according to claim 7 including a register coupling each execution unit to the microprocessor output port.

9. A system according to claim 7 including the step of comparing the time stamp of a current instruction unable to be received by the execution unit with the time stamps of instruction in the pipeline, and means for discarding the instructions in the pipeline in dependence on the result of the comparison.

10. A system according to claim 9 in which the means for discarding instructions in the pipeline does so if their time stamps are greater in value than that of the current instruction.

11. A system according to claim 7 in which the means for restarting a stalled thread includes means for reading an instruction memory from an address corresponding to the address in which the current instruction which was unable to execute is stored.

12. A system according to claim 7 including means for scheduling multiple threads of instructions for execution units through the microprocessor and means for continuing to execute non-stalled instruction threads in the event that one of the threads is unable to execute.

* * * * *